3,189,646
PROCESS FOR THE PREPARATION OF N-METHYLOL AMIDE DERIVATIVES
Norman B. Rainer, North Bellmore, N.Y., assignor to Coastal Interchemical Company, Brooklyn, N.Y.
No Drawing. Filed Apr. 26, 1962, Ser. No. 190,216
3 Claims. (Cl. 260—561)

This invention relates to N-methylol acetamido amines and methods for their production.

It is an object of this invention to provide novel N-methylol acetamido amines capable of condensing with substances containing active hydrogen atoms by loss of water therebetween.

It is a further object of this invention to provide mildly cationic water-soluble N-methylol acetamido amines useful in effecting durable property modifications in cellulosic materials.

It is still a further object of this invention to provide a novel process for the production of N-methylol acetamido amines.

It is still another object to provide a novel, single stage process for the production of compounds containing both N-methylol and N-alkyl acetamido amines. These and other objects and advantages will become apparent hereinafter.

The objects of this invention are accomplished in general by providing N-methylol acetamido amine compounds represented by the formula:

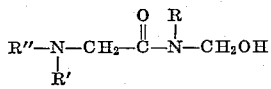

wherein R is a member selected from the group consisting of hydrogen, methylol, and alkyl; R' is a member selected from the group consisting of hydrogen, acyl, alkyl, aryl and N-substituted acetamido; and R" is a member selected from the group consisting of alkyl, aryl and N-substituted acetamido. The products of this invention are prepared by reacting a cyanomethylamine compound with formaldehyde and water in a reaction zone made basic with ammonia.

The N-methylol acetamido amine compounds of this invention are found to react with cellulose at temperatures between about 80° C. and 250° C. in the presence of acidic catalytic agents such as zinc nitrate, metal chlorides and the like, generally found useful in urea-formaldehyde condensation reactions. The reaction with cellulose probably involves the splitting out of a molecule of water between the N-methylol group and the hydroxyl group on cellulose with formation of N-methylene ether bridges joining the two substances. Regardless of the exact chemical mechanism however, the N-methylol acetamido amine compounds of this invention are found to become durably fixed to cellulose. Treated cotton fabrics retain the methylol compound even after ten ordinary launderings. When the N-methylol compound contains more than one N-methylol group, cross linking of cellulosic structures is obtained, which results in improved crease retention in the case of fabrics, and improved wet strength in the case of papers. Preferred poly(N-methylol)acetamido amines for cross linking utility include: bis(N-methylol acetamido) amine, having the formula $HN(CH_2—CONHCH_2OH)_2$; bis(N,N dimethylol acetamido) amine, having the formula $$HN(CH_2—CON(CH_2OH)_2)_2$$

tris(N-methylol acetamido) amine, having the formula $N(CH_2—CONHCH_2OH)_3$; polyoxyethylene bis(N-methylol acetamido) amine, having the formula

where $n$ is an integral number greater than zero; N-stearyl acetamido, bis(N-methylol acetamido) amine, having the formula $$N(CH_2—CONH(CH_2)_{17}CH_3)(CH_2—CONHCH_2OH)_2$$

tetra(N-methylol acetamido) ethylene diamine, having the formula

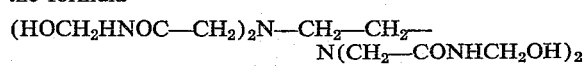

N,N bis(N-methylol acetamido) stearamide, having the formula $CH_3(CH_2)_{16}—CON(CH_2—CONHCH_2OH)_2$; and analogous derivatives containing other substituted and unsubstituted alkyl groups. Alkyl groups may be defined as non-aromatic organic radicals containing carbon-to-carbon linkages, and containing other common atoms or chemical groups, or other N-methylol acetamido amine groups bonded to the carbon valences.

The N-methylol compounds of this invention, in view of their amino group, carry a weak cationic charge in acidic and aqueous systems. In aqueous systems, the compounds have a cationic or base strength weaker than that of ordinary aliphatic organic amines. The weak cationic strength may be attributable to the electron attracting effects of the acetamido group attached to the amino group. In view of their low basicity, the compounds of this invention are found to be compatible in acidic or basic systems where stronger amine compounds exhibit compatibilities which vary with the pH of the system. In view of their mildly cationic nature however, the compounds of this invention have high affinity for negatively charged substrates such as cellulose.

In addition to cross-linking reactions with cellulose, the compounds of this invention may be employed to durably attach various chemical entities to cellulose to effect numerous property improvements. Thus, for example, water proofing effects are obtained when the N-methylol compound contains long chain fatty alkyl groups; flame retardency may be secured when the N-methylol compound contains halogen or phosphorous groups; colorations may be secured when the N-methylol compound contains chromophoric groups; and still further effects may be secured. The N-methylol compounds of this invention are also valuable in other reactions with chemical species reactive with hydroxyl groups. For example, the compounds may be reacted with monomeric or polymeric isocyanates, epoxy materials, acid chlorides, and acid anhydrides. Other condensation reactions may also be effected with materials having active hydrogen atoms, whereby methylene bridges are formed with the splitting out of a molecule of water. Typical active-hydrogen containing co-reactants are phenols, alcohols, and amines. Polymers may be prepared by the interaction of poly(N-methylol)acetamido amine species of this invention with poly functional co-reactants such as melamine, phenol, adipic acid, phthalic anhydride, and others.

The cyanomethyl amines employed in the process of this invention are in general commonly available or easily prepared by the reaction of formaldehyde and HCN with a primary or secondary amine or ammonia. (L. S. Luskin et al., J. Am. Chem. Soc., 78, 4042 (1956).) The cyanomethyl amines may be derived from mono or poly primary or secondary amines. An especially preferred class of cyanomethyl amines however, are the symmetrical species: nitrilotriaceto nitrile $N(CH_2CN)_3$; iminodiacetonitrile $HN(CH_2CN)_2$; alkyl iminodiaceto nitriles $RN(CH_2CN)_2$; and ethylene diamine tetra acetonitrile 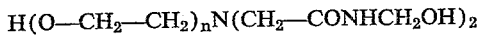.

In the process of this invention, it is generally found that each mole of N-methylol groups produced requires one mole of cyanomethyl amine groups, at least one mole of water; and about one mole of formaldehyde. Excess amounts of water are frequently desirable however, to increase the fluidity and temperature control of the system. It is generally found preferable to slowly add the formaldehyde to an excess amount of a mixture of the cyanomethyl amine and water. The reaction mixture must contain, and preferably should be saturated with, ammonia to initiate and maintain the reaction. This precludes the presence of excess strong acid, especially strong inorganic acids. In face, the presence of even minor amounts of the cation radicals of strong acids is generally undesirable. Other reactive or inert species may also be present in the reaction mixture. Aliphatic primary and secondary amines, when present in the mixture, may react concurrently to form N-alkyl acetamido amine groups. Epoxy compounds which interact slowly with water are found to give N-alkanol acetamido amine groups in the course of the reaction process. Inert miscible and immiscible solvents may be employed.

Temperatures in the range of 30° C. to 125° C. are generally satisfactory in carrying out the reaction process of this invention. The optimum temperatures for any given system will depend upon the concentrations of reactants, pressures, order of addition of reactants, rate of agitation, presence or absence of non-aqueous solvents, and the inherent reactivity of the cyanomethylamine employed. It is frequently desirable to exclude oxygen during the reaction to avoid discoloration. The equipment employed in carrying out the process may be closed or open vessels provided with means for heating, agitation, refluxing, and temperature control.

The N-methylol acetamido amine products of this invention are non volatile and are generally obtained as non-crystalline solids or semi-solids, depending upon molecular weight and the nature of the groups R, R' and R''. The products may in general be purified by: treatment with activated charcoal; factional precipitation from solvent-nonsolvent mixtures; chromatographic adsorption on elution columns employing adsorbent packings such as activated alumina, silicic acid, and activated charcoal; and preparation and purification of chemical derivatives. Analytical methods found useful in characterizing the products are: elemental analysis; titrations in glacial acetic acid; preparation and analysis of derivatives and degradation products; infra-red spectrophotometric analysis; nuclear magnetic resonance spectra; functional group analysis; and other conventional physical and chemical methods of identification.

The following examples serve to illustrate the invention but they are not intended to limit it thereto. All parts and percentages are by weight unless otherwise indicated.

*Example I*

One hundred and thirty-four grams of nitrilo triacetonitrile and 300 cc. of distilled water are charged to a one liter, 4 necked flask equipped with agitator, thermometer, dropping funnel, external heating mantle, reflux condenser, and ammonia gas inlet. Ammonia gas is bubbled through the mixture at a rate of about 25 bubbles per minute. The mixture is gradually heated to 50° C., and dropwise addition of 252 grams of 37% formaldehyde is begun. The mixture is maintained under continuous agitation and continuous flow of ammonia, with dropwise addition of the entire amount of formaldehyde over a twelve hour period. During this time, the nitrilo triaceto nitrile dissolves, and the solution darkens to a brownish color. Flow of ammonia is discontinued, and the solution is then heated at 65° C. with stirring for three hours. Twenty grams of activated charcoal are added to the reaction product solution, and the mixture is cooled and filtered. The filtrate is dried in a vacuum evaporator to remove water, ammonia, and formaldehyde. The resulting paste-like product is washed with acetone, and then dried for two days in a vacuum desiccator over $P_2O_5$. The product, tris(N-methylol acetamido) amine, obtained in 73% yield, is an amorphous deliquescent solid. Elemental analysis confirms the expected structural formula:

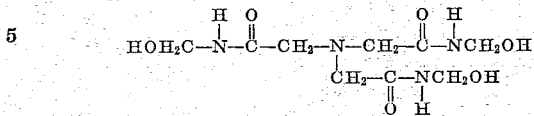

An aqueous solution is prepared containing 7% of the tris(N-methylol acetamido) amine product of this example, and 0.3% zinc nitrate. This solution is sprayed onto strips of chromatographic grade filter paper, to the extent of 100% weight gain. The sprayed paper strips are cured in a circulating air oven at 185° C. for three hours, and then subjected to measurements of wet tensile and tear strengths. The treated strips are found to average about 14% better in these wet strength tests than equivalent untreated paper.

*Example II*

Ninety five grams of iminodiaceto nitrile $HN(CH_2CN)_2$, 250 cc. of distilled water, and 105 grams of diethanolamine are charged to a one liter flask equipped as described in Example I. The mixture is slowly heated to 57° C. with continuous agitation. The solution becomes homogenous, and develops a greenish color as the diethanolamine begins to interact with cyano groups to liberate ammonia and form N,N bis-(hydroxy ethyl) acetamido groups. When ammonia is detected emanating from the top of the reflux condenser, dropwise addition of 90 grams of 37% aqueous formaldehyde is begun. Temperature and agitation are maintained over a period of 16 hours, during which time steady addition of formaldehyde is maintained, and the mixture is kept saturated with ammonia either by way of ammonia generated by the reaction of diethanolamine, or by gaseous ammonia bubbled through the mixture. The resulting reaction product mixture, which is reddish brown in color, is treated with 20 grams of activated charcoal, and filtered. The filtrate is dried in a vacuum evaporator to remove water, ammonia, and formaldehyde. The resulting paste-like product is washed with acetone, and then dried for two days in a vacuum desiccator over $P_2O_5$. The product N,N bis-(hydroxyethyl) acetamido, N methylol acetamido amine, $$HN(CH_2-CONHCH_2OH)(CH_2-CON(CH_2CH_2OH)_2)$$

obtained in 64% yield, is an amorphous deliquescent solid. Elemental analysis, and hydroxyl group analysis by the acetic anhydride technique, confirm the expected structural formula.

An aqueous solution is prepared containing 12% of the N-methylol compound of this example, and 0.3% cerium chloride. Strips of cowhide leather are immersed in this solution at 80° C., removed, wrung out, and cured in an air-circulating oven at 170° C. for three hours. The treated leather strips are found to have suppleness or flexibility which is retained even after re-wetting with water or washing with detergent solutions.

*Example III*

The process of Example I is repeated using ethylene diamine etra acetonitrile (216 grams) instead of nitrilo triacetonitrile, and 336 grams of 37% formaldehyde. The product, tetra (N methylol acetamido) ethylene diamine;

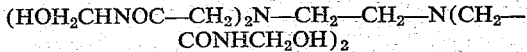

obtained in 67% yield is an amorphous water-soluble water-soluble solid.

Forty grams of the N-methylol product of this example are mixed with ten grams of phenol in a small stirred flask, and the mixture is heated at 100° C. for three hours. The mixture, at first fluid, rapidly thickens to a highly viscous syrup. The syrup is poured into molds and cured at 185° C. for three hours. The cured, shaped products thereby obtained are extremely hard, insoluble in all ordinary solvents, an non-meltable.

*Example IV*

One hundred and fifty grams of an ethylene oxide addition produced of iminodiaceto nitrile, having the formula $H(OCH_2CH_2)_{22}N(CH_2CN)_2$, and 300 cc. of distilled water are charged to a one liter flask equipped as described in Example I. Ammonia gas is bubbled through the mixture at a rate of about 25 bubbles per minute. The mixture is gradually heated to 55° C., and dropwise addition of 15 grams of 37% aqueous formaldehyde is begun. The mixture is maintained under continuous agitation, continuous flow of ammonia, with dropwise addition of the entire amount of formaldehyde over a two hour period. Heating is continued for ten hours. The mixture becomes homogenous and viscous. The product is isolated by the method of Example I. The product is found useful as a sizing agent for papers, which can be thermally cured onto the paper for improvements in wet strength.

*Example V*

One hundred and thirty four grams of nitrilotriaceto nitrile, 250 cc. of distilled water, 100 cc. of xylene, and 269 grams of monostearylamine are charged to a two liter flask equipped as described in Example I. The mixture is gradually heated to 58° C. with continuous agitation. Ammonia begins to evolve as the stearyl amine reacts with cyano groups to form N-stearyl acetamido groups. When ammonia begins to emanate from the top of the reflux condenser in steady flow, dropwise addition of 168 grams of 37% aqueous formaldehyde is begun. Temperature and agitation are maintained over a period of 18 hours, during which time steady addition of formaldehyde is maintained, and the mixture is kept saturated with ammonia either by way of ammonia generated by the reaction of the stearyl amine, or by gaseous ammonia bubbled through the mixture. The product is isolated by the procedure of Example I except that a washing step with xylene is included, to remove di-stearyl acetamido byproduct. The product, N stearylacetamido, bis(N-methylolacetamido) amine,

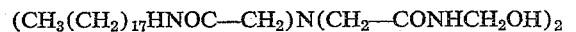

$(CH_3(CH_2)_{17}HNOC—CH_2)N(CH_2—CONHCH_2OH)_2$ is obtained in 47% yield. The product forms cloudy aqueous solutions in concentrations up to about 10%. When said 10% aqueous solution containing 0.3% zinc nitrate are padded onto cellulosic fabrics and cured at 210° C., a softness is imparted to the fabric which resists removal by laundering.

*Example VI*

One hundred and fifty grams of cyanomethyl dilauryl amine, 200 cc. of distilled water, and 100 cc. of dioxane are charged to a one liter flask equipped as described in Example I. Ammonia gas is bubbled through the mixture at a rate of about 25 bubbles per minute. The mixture is gradually heated to 60° C. and dropwise addition of 32 grams of 37% aqueous formaldehyde is begun. The mixture is maintained under continuous agitation, continuous flow of ammonia, with dropwise addition of the entire amount of formaldehyde over a three hour period. Heating is then continued at 75° C. for six hours. The product is isolated by the method of Example I. Eighty eight grams of N-methylol acetamido, dilauryl amine, N $((CH_2)_{11}CH_3)_2(CH_2—CONHCH_2OH)$ are obtained, representing a 52% yield.

The methylol product of this example may be usefully employed as an additive to melamine-formaldehyde/alkyd mixture bake-on enamel coating formulations. Amounts of this methylol product in the range of 1–7% may be cured into the coating during the baking operation, and resist removal by water or organic solvents. Coatings thus prepared exhibit corrosion inhibiting tendencies in view of the durably retained dilauryl amine group.

*Example VII*

One hundred grams of t-octyl amino acetonitrile, $CH_3(CH_2)_7—NHCH_2CN$, 200 cc. of distilled water, ten cc. of saturated aqueous ammonia solution, 50 cc. of dimethyl formamide, and 119 grams of 37% aqueous formaldehyde are charged to a one liter high pressure autoclave provided with means for heating and agitation. The autoclave is heated at 125° C. for ten hours with continuous agitation. The vessel is then cooled and opened. The reaction product is isolated by the method of Example I. The product, N,N-dimethylol acetamido, t-octyl amine, is obtained in 57% yield.

While there is herein described but a few embodiments of the present invention, both from a process and product point of view, it is intended that all such inventive subject matter reasonably equivalent to the present disclosure shall be embraced within the scope of the appended claims, which are to be constructed validly as broadly as the state of the prior art permits.

I claim:

1. A process for the production of N-methylol acetamido amine compounds comprising reacting a cyanomethylamine compound with formaldehyde and water in a reaction zone containing ammonia.

2. The process of claim 1 wherein said cyanomethylamine is a member selected from the group consisting of nitrilotriacetonitrile, iminodiacetonitrile, N-alkyl iminodiacetonitrile, and ethylenediamine etera acetonitrile.

3. The process of claim 2 wherein said reaction zone also contains an alphatic primary or secondary amine.

References Cited by the Examiner

UNITED STATES PATENTS

| | | | |
|---|---|---|---|
| 2,269,147 | 1/42 | Dickey et al. | 260—558 XR |
| 2,516,674 | 7/50 | Bruce et al. | 260—561 |
| 2,534,204 | 12/50 | Mowry | 260—561 XR |
| 2,921,085 | 1/60 | Schramm | 260—561 XR |

FOREIGN PATENTS

| | | |
|---|---|---|
| 1,072,082 | 12/59 | Germany. |
| 1,102,135 | 3/61 | Germany. |

IRVING MARCUS, *Primary Examiner.*

WALTER A. MODANCE, *Examiner.*